United States Patent Office 2,695,913
Patented Nov. 30, 1954

2,695,913

ALKYLARYL URETHANS

Herman S. Bloch and Donald R. Strehlau, Chicago, Ill., assignors to Universal Oil Products Company, Chicago, Ill., a corporation of Delaware No Drawing. Application August 30, 1950,
Serial No. 182,403

19 Claims. (Cl. 260—471)

This invention relates to a process for the manufacture of alkylaryl urethans and to novel compositions of matter containing said urethan derivatives which have surface-active and other useful properties. One of the outstanding applications of the products of the present invention concerns their use in compositions of matter having surface-active properties and containing said alkylaryl urethans either individually or in combination with other substantially neutral organic compounds having surface-active properties.

In accordance with well-established principles concerning the phenomena of detergency exhibited by certain compounds in aqueous solution, the selection of a suitable compound which will exhibit such properties depends upon the choice of the proper chemical groups which when substituted on an organic compound will present a critical balance of the hydrophilic and hydrophobic groups in the molecule, so that the compound is capable of orientation in a solution of the compound in an appropriate solvent with other molecules of the compound to form a detergent micelle. The present invention concerns nonionic surface-active compounds in which the hydrophilic group is a water-solubilizing urethan, and the hydrophobic group is an alkyl aromatic hydrocarbon radical in which the alkyl group contains at least three, and up to about 20 carbon atoms per group, depending upon the relative water solubilizing capacity of the urethan group as against the hydrophobic activity of the alkylaryl group. The group comprising the urethan substituent which tends to solubilize the product in water is derived from a hydroxy compound, represented, for example by the monomeric glycols, glycol mono-ethers and mono-esters, the polyoxyalkylene glycols, and their mono-ethers and mono-esters, and other organic compounds containing, besides other substituents, at least two hydroxyl groups per molecule, such as the simple monosaccharide sugars of the pentose and hexose series, the disaccharide sugars, the polymeric hexoses, such as starch, and partially esterified or etherified polyhydroxy compounds, including derivatives of glycerol, pentaerythritol, dipentaerythritol, 1,1,1,trimethylolethane, and the like.

One object of this invention is to provide a novel class of compounds certain members of which have surface-active properties in aqueous solutions thereof, while other derivatives possess surface-activity in non-aqueous, organic solutions.

Another object of this invention is to provide a solid detergent product which may be molded in the form of bars and which has the desirable lathering and mucilaginous properties of soap, but which, on the other hand, unlike soap, does not precipitate a curd when used in hard water containing calcium and magnesium ions in solution or in sea water.

A further object of the invention is to prepare a non-ionic, liquid surface-active agent soluble in water and compatible with cationic, anionic, or other non-ionic surface-active agents, and with builder salts, water softeners, etc.

Still another object of the invention is to prepare a non-ionic surface-active agent soluble in oleaginous media such as hydrocarbon and vegetable oils and other organic solvents.

One embodiment of the invention concerns an alkylaryl urethan having an alkyl substituent on the aryl nucleus containing from about 3 to about 20 carbon atoms per alkyl substituent.

Another embodiment of the invention relates to a composition of matter comprising an alkylaryl urethan and a substantially neutral, organic surface-active agent.

Another embodiment of this invention concerns a process for the manufacture of an alkylaryl urethan which comprises reacting an alkylaryl isocyanate in which the alkyl group contains from about 3 to about 20 carbon atoms per group with a water-soluble polyoxyorganic compound containing at least one hydroxy group, said compound containing a sufficient number of water-solubilizing oxy-groups relative to the hydrocarbon residue of the organic compound to effect a balance of the hydrophilic characteristics of the urethan group with the hydrophobic characteristics of the alkylaryl group and thereby impart surface activity to said alkylaryl urethan product.

Still another embodiment of the invention concerns a process for the manufacture of an alkylaryl urethan which comprises nitrating an alkylaryl hydrocarbon, the alkyl group of which contains from about 3 to about 20 carbon atoms per group, reducing the nitro group of the product to an amino group, reacting the resulting product with carbonylchloride, segregating an alkylaryl isocyanate from the product thereof and condensing the same with a polyoxy carbinol.

A more specific embodiment of the invention concerns a process for the manufacture of a dodecyltolylurethan derivative which comprises nitrating dodecyltoluene, reducing the resulting nitro-substituted dodecyltoluene to dodecyltoluidine, reacting said dodecyltoluidine with carbonylchloride to form dodecyltolylisocyanate and reacting said isocyanate in the presence of a condensation catalyst consisting of pyridine with a polyoxyalkylene glycol having a molecular weight of from about 400 to about 6000 and containing from 2 to 5 carbon atoms per oxyalkylene group to form said dodecyltolylurethan.

Other objects and embodiments of the invention, more specifically setting forth the present process and its products will be referred to in greater detail in the following further description of the invention.

This invention is particularly directed to alkylaryl urethans in which the aryl group is mono-cyclic or benzenoid in structure, although certain alkyl derivatives of polycyclic aromatic urethans also have surface-active properties; the compounds designated herein as alkylaryl urethans are intended to include both the benzenoid and polycyclic aromatic species. Of the latter polycyclic aryl derivatives, those derived from dicyclic (e. g. naphthalene or biphenyl) and tricyclic (e. g. anthracene or phenanthrene) compounds are particularly effective when attached to a monovalent urethane group of the configuration herein provided for the preparation of products having surface activity in solution of aqueous as well as organic solvents. It is evident, however, that since the surface-activity and particularly the effectiveness of the ultimate product as a detergent is dependent upon the proper balance of the effects of both the hydrophilic group (the water solubilizing urethan substituent in the molecule) and the hydrophobic portion of the molecule (the alkylaryl portion of the molecule), the number and chain length of the alkyl substituents on the aryl nucleus and the length of the urethan chain required to arrive at a particular structure having optimum surface-activity will be different for the alkylphenyl urethans than for the alkyl polycyclic aryl urethans. In general, the most effective derivatives of the alkylphenyl series contain a single long chain alkyl substituent of from about 8 to about 20 and preferably from about 9 to about 15 carbon atoms per group, and not more than two additional alkyl groups of relatively short chain length containing not more than 3 carbon atoms per group. In characterizing the structure of the present alkylphenyl urethans further, it is preferred that the short chain alkyl groups, if present, do not occupy nuclear positions meta (including both the 3- and the 5-positions) relative to the long chain alkyl group. In the alkyl polycyclic aryl derivatives, the relatively long chain alkyl group preferably contains not more than about 12 and not less than about 3 carbon atoms per group. Some of the preferred starting materials in the present process comprise such alkylaryl hydrocarbons as hexylbenzene, nonylbenzene, dodecylbenzene, pentadecylbenzene, octadecylbenzene, the corresponding ortho-, meta-, and para-hexyl-, nonyl-, dodecyl-, pentadecyl-, and octadecyltoluenes, -xylenes, -ethylbenzenes, -ethyltoluenes, and -isopropylbenzenes of the mononuclear or phenyl series, and amyl-, amylmethyl-, amylethyl-, and methylpropyl-naphthalenes and phenanthrenes, hexyldiphenyl, and like compounds in the polycyclic aryl hydrocarbon series. The urethan compounds herein provided containing a phenyl nucleus as distinguished from the polynuclear alkylaryl hydrocarbons are particularly preferred as general detergent and emulsifying agents in aqueous systems because of their more desirable properties, which probably result from the presence of fewer isomeric forms than are present in the case of the polynuclear derivatives.

In both the mono and polycyclic alkylaryl urethan series, the products of this invention, herein designated as urethan derivatives of alkylaryl hydrocarbons may also be optionally characterized as the urethanyl phenylene derivative of the alkanes corrsponding in chain length to the alkyl group; thus, for example, a polyoxyalkylene paradodecyltolylurethan may alternatively be denominated as a urethanyltolylenedodecane, having the empirical structure represented by the following formula:

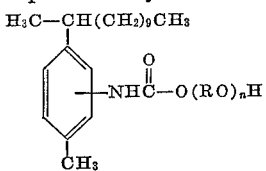

where R is a bivalent alkylene group containing from 2 to about 5 carbon atoms per group, and $n$ is a whole number having a value of from about 5 to about 150. Likewise, a polyoxyalkylene amylmethylnaphthylurethan may be optionally designated as methylurethanylnaphthylenepentane, represented structurally as:

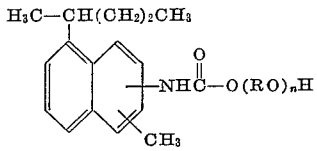

The alkyl aromatic hydrocarbons which form the structural basis upon which the hydrophilic urethanyl substituents are appended and which in themselves constitute the hydrophobic portions of the surface-active urethan products are formed by alkylation of the corresponding aromatic hydrocarbon with an alkylating agent having the chain length and structure of the desired long chain alkyl group. Suitable alkylating agents, the choice of which depends upon the chain length desired and the availability of the alkylating agent in the particular form for products of optimum detergency, may be selected from the relatively large number of organic compounds capable of reacting, in the presence of an acidic condensation catalyst to yield an alkyl group of the desired chain length capable of being transferred and becoming attached to the aryl nucleus of the aromatic hydrocarbon reactant in the system. Thus, for example, aliphatic alcohols, dialkyl ethers, aliphatic alcohol esters, mercaptans, alkyl halides, and particularly, olefinic hydrocarbons, form alkyl radicals either by fission of the alkylating agent at a point in the structure of the molecule which yields an alkyl residue as one of the fission products (as in the case of the esters, ethers, mercaptans, etc.) or which upon contacting the catalyst form a reactive carbonium ion. Olefinic hydrocarbons of desired chain length are preferred as alkylating agents, since these are readily available in commercial quantities in the chain lengths and structure generally desired to form detergents having optimum surface-activity. Although the method of forming alkyl aromatic hydrocarbons will be particularly directed herein toward the use of olefinic alkylating agents, it is to be emphasized that other classes of organic compounds as hereinabove specified, may likewise be effectively utilized to produce the starting material referred to as an alkyl aromatic hydrocarbon.

Olefinic alkylating agents of suitable chain length and structure may be obtained from various sources, one of the preferred being the olefinic polymers formed by polymerizing lower molecular weight olefins, such as ethylene, propylene, a butylene, etc. either thermally or in the presence of a polymerization catalyst, such as a phosphoric or sulfuric acid. Another source of the olefinic hydrocarbons suitable as alkylating agents to form the alkylaryl hydrocarbon starting materials in the present process include appropriately boiling fractions of pressure distillates, separated from the products of thermally cracked petroleum charging stocks, such as gas oil fractions, topped crude, etc. Still another source of suitable olefins are the dehydrohalogenation products of alkyl halides, the dehydration products of a suitable long chain alcohol, and synthetic olefines such as are made in Fischer-Tropsch syntheses.

In the production of an alkylbenzene starting material in which the long chain alkyl group desirably contains from about 8 to about 20 carbon atoms per group, and preferably from about 9 to about 15 carbon atoms, the preferred source of the alkylating agent for the preparation of the alkyl aromatic starting material is a propylene polymer containing the same number of carbon atoms per molecule as desired for the alkyl group of the ultimate product. One process widely used in the petroleum refining industry consists in passing a mixture of propane and propylene (which may also contain minor amounts of other paraffins, olefins or hydrogen) over a so-called "solid phosphoric acid catalyst" comprising a calcined composite of pyrophosphoric acid on kieselguhr (containing approximately 62% total $P_2O_5$) at a temperature of from about 300° to about 500° F., and subsequently fractionating the resulting olefinic polymer product to recover a fraction having a boiling point corresponding to the molecular weight range of the olefin desired for alkylating the particular mono- or polynuclear aromatic hydrocarbon starting material. The preferred fraction for detergent production in which benzene or toluene is utilized as starting material for the preparation of the alkylate consists of hydrocarbons containing from about 9 to about 15 carbon atoms per molecule and boiling at normal pressure from about 140 to about 260° C. For detergent products requiring a longer chain alkyl group to develop optimum surface-activity, propylene polymer fractions having the particular molecular weight desired may be separated from the total polymer products by fractional distillation, preferably at subatmospheric pressure.

The preparation of the alkyl aromatic hydrocarbon starting material by the alkylation of an aromatic hydrocarbon with a long chain olefin is effected in a preliminary stage of the present process by contacting a mixture of the aromatic and olefinic hydrocarbons with a condensation catalyst, the proportion of aromatic and olefinic hydrocarbons in the reaction mixture being at least equimolecular, and preferably from about 1.5 mols of aromatic hydrocarbon per mol of olefinic alkylating agent to about 10 molar proportions thereof. Suitable alkylating catalysts for the reaction are selected from the general group broadly characterized as acidic condensation catalysts which are charged to the process in catalyzing quantities, generally from about 0.1 to about 1.5 pounds of catalyst per pound of olefinic alkylating agent, depending upon the ease of condensation between the respective olefinic and aromatic reactants and the activity of the catalyst which in turn depends upon the concentration of the active catalyzing component in the reagent utilized. The alkylation reactants and catalyst are contacted under mixing conditions sufficient to obtain an intimate dispersion of the catalyst and hydrocarbon reactants at temperatures of from about −30° to about 100° C., and preferably from about 0° to about 50° C. to obtain optimum alkylate production. Suitable condensation catalysts known generally in the art as acid-acting catalysts include, in general, such inorganic compounds as sulfuric acid containing not more than about 10% by weight of water, hydrofluoric acid containing not more than about 10% by weight of water, anhydrous aluminum bromide, and aluminum chloride, desirably in the presence of anhydrous hydrogen bromide or hydrogen chloride, respectively, mixtures of hydrogen fluoride and boron trifluoride, and others, including the general group referred to as "Friedel Crafts" catalysts generally recognized as having catalytic activity in promoting hydrocarbon alkylation reactions. The hydrocarbon alkylate product separates as a distinct phase from the spent acid catalyst phase and may be subsequently separated into fractions representing alkylates preferred for particular detergent uses by fractional distillation (preferably at subatmospheric pressures). In the case of benzene and toluene alkylates of dodecylene which, in general, are the preferred intermediate alkylates of this invention, the fraction desired for conversion to the urethan detergent derivative boil normally at from about 260° to about 345° C. The boiling range of other desired alkylates utilizable for detergent production generally vary in accordance with the particular nuclear aryl group and with the chain length of the alkyl substituent.

A procedure normally applicable to either the mono- or polycyclic alkyl aromatic hydrocarbon starting materials for the introduction of a urethan group having the empirical formula: —NHCOOR on the aryl nucleus of the alkylate comprises the following series of successive reaction steps: (1) subjecting the alkylaryl hydrocarbon to nitration under such conditions that a single nitro group is substituted on one of the nuclear aryl positions, (2) selectively reducing the nitro group of the resulting nitro alkylaryl hydrocarbon to form the corresponding amino-substituted alkylaryl compound, (3) reacting the latter amine with phosgene (carbonyl chloride) to form the corresponding alkylaryl isocyanate, and (4) thereafter condensing the isocyanate intermediate product with an organic polyoxy compound containing a replaceable hydrogen atom on at least one hydroxyl substituent thereof to form the present urethan surface-active agent which has the following empirical structure:

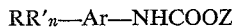

wherein Ar is a mono- or polynuclear aromatic polyvalent radical, $n$ is 0, 1, or 2, $R$ is an alkyl group containing from 3 to about 20 carbon atoms per group, $R'$ is an alkyl group containing from 1 to 2 carbon atoms per group, $Z$ is a monovalent polyoxy group. One of the preferred classes or urethane derivatives contemplated herein, formed by the condensation of an alkylaryl isocyanate with a polyalkylene glycol as representative of the polyoxy organic reactant specified herein is represented structurally by the empirical formula:

wherein R, R', Ar, and $n$ have the values hereinabove specified for the products prepared from polyoxy organic compounds broadly, while Z in the latter formula is a bivalent alkylene group containing from 2 to 5 carbon atoms per group, and $m$ is a whole number having a value of from about 5 to about 150, preferably, from about 10 to about 50. The optimum number and chain lengths of the alkyl substituents on the aryl nucleus vary in accordance with other characteristics of the product molecule, including the water-solubilizing ability of the hydrophilic group, the molecular weight of the polyoxy organic reactant utilized in the condensation state of the process to form the urethan product, the chain length of the alkylene group of the polyoxy reactant if it is a polyoxyalkylene compound, and other factors in the molecular structure which mutually operate to determine the detergency and solubility of the resulting product in aqueous or non-aqueous systems.

The polyoxy organic compound containing an active hydrogen atom on one or more hydroxyl groups thereof, which compounds when condensed with an alkylaryl isocyanate form the urethan products of this invention, may be selected from the relatively large number of polyoxyalkylene compounds of this class containing from 2 to about 5 carbon atoms per alkylene group and at least one hydroxyl group per molecule. Some of the general classes of compounds and specific exemplary members of such classes utilizable in the present process include the polyalkylene glycols of which the polyethylene glycols of molecular weights of from about 200 to about 10,000, preferably from about 300 to about 1500, represent one of the preferred species. Other polyalkylene glycols which form the present urethan derivative products are the polypropylene glycols having molecular weights from about 200 to about 2,000, preferably from about 400 to about 1500, and the polybutylene and polyamylene glycols, preferably of molecular weights of from about 600 to about 3000. The mono-ethers and mono-esters of these polyoxyalkylene glycols may also be used. The polyalkylene glycol class of compounds may be represented by the empirical formula: $OH[(CH_2)_mO]_nH$, wherein $m$ represents a small whole number having a value of from 2 to 5 inclusive and $n$, representing the number of oxyalkylene groups or units per molecule of glycol, has a value of from about 5 to about 150, preferably from about 10 to about 40.

Other polyoxy organic compounds utilizable in the present process by reaction with the alkylaryl isocyanate intermediate products to form the present surface-active agent include the polyols in which the oxygen atoms present in the structure of the polyol compounds appear exclusively as hydroxyl groups. Typical specific members of the polyol reactants contemplated, include inositol, pentaerythritol, the various polyvinyl alcohols within the above range of molecular weights, arabitol, xylitol, adonitol, mannitol, dulcitol and sorbitol.

Still another group of organic polyhydroxy compounds capable of undergoing condensation with the alkylaryl isocyanate intermediate of the present process consists of polyhydroxy compounds in which all of the oxygen atoms do not appear exclusively in the compound as hydroxyl groups, but rather, some of which appear as ether, ketone, aldehyde, or ester linkages. Such compounds include the intermolecular condensation products of other polyhydric alcohols containing an ether linkage, such as, polypentaerythritol, polyinositol, polysorbitol, and others; the mono- and polysaccharides of both the pentose and hexose series and their polymers which structurally represent polyhydroxy organic compounds containing a carbonyl group of either ketonic or aldehydic structure, such as glucose, sucrose, mannose, the polyhexose carbohydrates, such as, starch, etc.; and the polyhydroxy alcohol esters containing at least one free hydroxyl group such as the various organic acid esters of the polyethylene glycols, and compounds of like structure.

The condensation of the present alkylaryl isocyanate intermediate product with a polyoxy organic compound, is effected at a reaction temperature of from about 50° to about 200° C., preferably from about 80° to about 150° C., and, in the case of certain less readily reacted polyoxy organic compounds, in the presence of a catalytic agent characterized as an organic nitrogen base. When a rapid reaction rate is desired for the condensation of any polyoxy organic compounds or when the individual reactants do not readily undergo condensation, the aforementioned organic nitrogen bases are very desirable to accelerate the rate of reaction or effect substantially complete reaction of the individual reactants. The reaction rate and completion of the reaction is also promoted by the exclusion of moisture from the reaction mixture, such as the moisture introduced by partially hydrated reactants or catalyst. It is also desirable in many instances to effect the condensation reaction in the presence of a solvent for one or more of the reactants and catalyst, the solvent being generally selected from the alcohol esters, such as ethylacetate, hydrocarbons, preferably aromatic hydrocarbons, such as benzene, toluene, etc., chlorohydrocarbons, such as ethylene dichloride, chlorobenzene, etc. and ethers, such as dibutyl ether, diamylether, etc., preferably those compounds having a boiling point corresponding to the desired reaction temperature. In many instances, in order to obtain the desired reaction temperature above the boiling point of the solvent, it is advisable to conduct the condensation reaction at a superatmospheric pressure sufficient to maintain the solvent and reactants in substantially liquid phase.

The organic nitrogen bases which act as catalytic agents in the present condensation reaction are characterized as compounds within the above classification which have pH's in aqueous solution greater than 7. The organic nitrogen bases utilizable as catalysts in the present condensation reaction are further characterized in having no active hydrogen atom substituted on the nitrogen atom of the organic base which, if present, would undergo condensation with the alkylaryl isocyanate reactant to partially remove the latter reactant charged into the condensation reaction mixture. The catalysts are thus selected from the tertiary amines and the quaternary ammonium bases, including such compounds as triethyl amine, tripropylamine, tributylamine, di-isobutylmethylamine, di-isoamylmethylamine, pyridine, N-methyl piperidine, quinoline, dimethylbenzylamine, diethylbenzylamine, and others. The preferred organic bases usable as catalysts in the condensation reaction are the cyclic nitrogen compounds, such as pyridine, N-methyl, piperidine, and quinoline. The catalyst is added to the reaction mixture in an amount of from about 0.1 to about 20 weights per weight of alkylaryl isocyanate charged to the reaction mixture. The nitrogen base catalyst may generally be removed from the subsequent product by solvent extraction or by distillation or evaporation therefrom.

A urethan product prepared by the condensation of a polyoxy organic compound with an alkylaryl isocyanate may contain one or more free hydroxyl groups (depending upon the reactants chosen and on the molecular ratio of reactants) which may be further esterified with a carboxylic acid or etherified with another alcohol condensable therewith, preferably of relatively short chain length, to form the corresponding ester or ether, respectively. The latter may be the preferred form of the final product for reasons of modified solubility in water or organic solvents or because of the more pronounced mucilaginous or soap like qualities of the resulting product, not necessarily characteristic of the urethan product containing free hydroxyl groups. Typical instances of such products are the acetylated urethans formed by the condensation of an alkylaryl isocyanate with a mono- or di-acetylated polyol, such as inositol monoacetate or acetylated polyinositol. The acetylation reaction is generally effected by reacting the urethan compound with acetylchloride under acetylating conditions, or it may be conducted on the polyol prior to reaction of the latter with the alkylarylisocyanate.

The urethan condensation products of the present process vary in physical properties, particularly melting points, depending upon the chain length and degree of branching of the alkyl group of the alkylaryl isocyanate and more particularly upon the molecular weight of the polyoxy reactant utilized in the condensation thereof with the alkylaryl isocyanate intermediate. In the case of the low molecular weight glycols, and polyoxyalkylene compounds such as the mono- and poly-saccharides, and polyethylene glycols containing up to about 9 oxyethylene units, the resulting product is generally a viscous liquid which is insoluble in water. As the molecular weight of the polyols utilized in the condensation reaction increases to values of intermediate range, the products tend to be pasty solids which form a milky emulsion in water, particularly in hot water. The higher molecular weight polyols form condensation products with alkylaryl isocyanates which exist in the form of waxy solids and are soluble in water at all temperatures when the number of water-solubilizing oxy- or hydroxy groups is sufficient to impart water solubility to the resulting product. The latter materials are mucilaginous when dissolved in water, having many of the desirable physical properties of fatty acid soaps such as their characteristic feel to the human skin. The products form nonionic micelles in aqueous solution and are compatible in admixture with cationic, anionic and other nonionic detergents. They may be composited with other types of detergents either in liquid or solid form and are thus particularly desirable for the manufacture of detergents in bar form, either individually or in admixture with an anionic, cationic or other nonionic detergents. Amounts of our urethan detergents varying from about 1 to about 50% by weight of other detergents present in such composites have been found particularly advantageous. Builder salts, such as sodium sulfate, sodium polyphosphates, sodium silicate, and others well known in the art as well as extenders, abrasives, perfumes, water-softening compounds may also be composited with the present product to enhance its detergent and cleansing properties or its customer appeal.

It is to be noted particularly that the water solubility of the urethan products of the present invention is directly proportional to the number of water-solubilizing groups present in the polyoxy reactant utilized in the condensation reaction. The water solubility of the condensation product is more particularly dependent upon the chain length of the carbon to carbon skeleton relative to the number of water solubilizing oxy or hydroxy groups in the polyoxy reactant. Thus, a polyoxy compound containing a long chain carbon skeleton relative to the number of water-solubilizing oxy or hydroxyl groups in the compound is generally substantially insoluble in water, but relatively more soluble in oils and other organic solvents; thus, such products have little utility as a water-soluble detergent although the same compound is generally relatively soluble in organic solvents and may be utilized as a detergent in nonaqueous systems, such as the detergent component of a lubricating oil or cutting oil composition, or as an emulsifying agent. On the other hand, a polyoxy compound containing a relatively short carbon atom skeleton relative to each water-solubilizing oxy or hydroxyl group is generally readily soluble in water and when the chain length of the hydrophilic group attached to the urethane radical is of sufficient length and contains a sufficient number of said water-solubilizing groups, the resulting urethan compound is an effective aqueous detergent. It is therefore generally preferred, when water-soluble detergents are the desired product of the condensation reaction, to prepare the urethan product from polymeric short chain alkylene glycols or polyalkylene glycols in which the alkylene group contains relatively few carbon atoms, generally up to about 5 per alkylene group. When the final urethan product is desired as a detergent component in a nonaqueous system, the polyhydroxy or polyoxy reactant is preferably a compound in which the carbon skeleton contains a comparatively large number of carbon atoms relative to each water-solubilizing hydroxyl or oxy group, or the hydrophilic reactant is limited to compounds of relatively low molecular weight to restrict the number of water-solubilizing groups introduced into the resultant condensation product and promote its solubility in nonaqueous systems.

In some instances it becomes desirable to convert a water-insoluble urethan condensation product to a water-soluble product and in such instances any free hydroxyl groups which did not enter into the condensation reaction with the alkylaryl isocyanate reactant may be converted to derivative salts or esters to promote the water-solubility of the resultant condensation product. Thus, in the case of condensation products containing free hydroxyl groups, the latter may be converted into more water soluble derivatives by reaction with sulfuric acid to form a sulfate ester which may be used as such in an aqueous system or converted to the corresponding sodium salt thereof to form a substantially neutral anionic detergent product. Likewise, a water-soluble urethan condensation product may be converted to a water-insoluble material by converting the free hydroxyl groups of the urethan product to the corresponding ester or ether derivatives of strongly hydrophobic compounds.

The present invention is further illustrated with respect to specific embodiments thereof in the following examples. In thus describing specific illustrations of the invention it is not thereby intended to limit the generally broad scope of the invention in strict accordance therewith.

EXAMPLE I

I. Alkylation of aromatic hydrocarbons

A series of alkyltoluene hydrocarbons was prepared to provide the initial starting material in the production of alkylaryl isocyanates from which a variety of urethan derivatives were prepared by the procedure hereinafter described. The alkyltoluenes in which the alkyl group is hexyl, nonyl and dodecyl were prepared by alkylating toluene in the presence of an acidic condensation catalyst with olefinic propylene polymer fractions containing, respectively, a predominate proportion of hexylene, nonylene, and dodecylene as the corresponding alkylating agents. The following procedure describes the method of preparing the respective alkyl toluene hydrocarbons:

A. *Hexyltoluene*.—840 cc. of 98.5% sulfuric acid was charged to a 5 liter alkylating flask fitted with a mechanical stirrer and cooled to about 5° C. 828 grams (9 mols) of toluene was cooled to 5° C. and added to the sulfuric acid, followed by a solution of 504 grams (6 mols) of the hexylene fraction of a propylene polymer in 828 grams (9 mols) of toluene. The hexylene alkylating agent was a fraction having a boiling point of from 69 to 70° C., a specific gravity of 0.6900, and a bromine number of 70 and was separated by the fractional distillation of a mixture of propylene polymers formed by polymerizing a mixture of propylene and propane over a solid phosphoric acid catalyst (a calcined composite of pyro-phosphoric acid and kieselguhr containing about 62% $P_2O_5$). The solution of hexylene in toluene was added to the mixture of toluene and sulfuric acid catalyst over a period of 3 hours, accompanied with vigorous stirring of the resulting two phases. The mixture was then allowed to settle, resulting in the separation of 2 layers, an upper hydrocarbon layer and a lower predominantly sulfuric acid layer which was drawn off and discarded. The upper hydrocarbon layer was washed with water and aqueous alkali, dried over calcium chloride, and thereafter fractionally distilled to separate 230 grams of a fraction having a boiling point of 230 to 235° C. and a refractive index of 1.4935. Analysis of this fraction for $C_{13}H_{20}$ gave the following analytical results compared with the calculated analysis for carbon and hydrogen:

*Analysis.*—Calculated for $C_{13}H_{20}$: C, 88.63; H, 11.37%. Found: C, 88.85; H, 11.41%.

The 230–235 boiling range fraction had a specific gravity of 0.8675 and a molecular refraction of 59.06, as compared with the theoretical value of 58.63 for hexyltoluene.

B. *Nonyltoluene.*—750 grams (8.51 mols) of toluene was charged to a 5-liter alkylating flask fitted with a mechanical stirrer, two dropping funnels and a cooling bath which reduced the temperature of the toluene to 5° C. 630 grams (6.49 mols) of toluene and 630 grams (5 mols) of the nonylene fraction of a propylene polymer product (Boiling Point at 760 mm. Hg pressure: 130 to 145° C.) were mixed, cooled to 5° C. and charged into one of the dropping funnels. 800 cc. of cooled, 98.5% sulfuric acid was charged to the other dropping funnel and the two materials thereafter simultaneously introduced into the alkylating flask where the mixture was efficiently stirred at a temperature of approximately 5° C. over a period of 3 hours. Upon settling, the reaction mixture separated into two layers and the lower acid layer was decanted and discarded. The upper hydrocarbon layer was washed with water and sodium bicarbonate, dried and subjected to fractional distillation. The fraction having a boiling range of from about 270° to about 280° C. was separated for segregation as the nonyltoluene product, the fraction having the indicated boiling range weighing 846 grams.

C. *Dodecyltoluene.*—This alkylate was prepared in a manner similar to that described for the preparation of nonyltoluene, except that a dodecylene fraction, comprising the 170–225° C. fraction of a propylene polymerization product was utilized in the alkylation reaction with toluene in the presence of sulfuric acid having a concentration of 98.5%. The dodecyltoluene product was separated as the fraction of the hydrocarbon product of the reaction having a boiling range of from about 275 to about 325° C.

II. *Preparation of alkylaryl isocyanate derivatives of alkyltoluene hydrocarbons*

A. *Mono-nitrononyltoluene.*—In the case of each of the above toluene alkylates, that is, hexyltoluene, nonyltoluene, and dodecyltoluene, the iso-cyanate derivatives thereof were prepared in accordance with a uniform procedure for each alkylate involving initially nitrating the alkyltoluene, reducing the nitro group of the product to the corresponding alkyltoluidines, and reacting the latter product with phosgene (carbonyl chloride) to introduce the isocyanate group. Since a similar procedure was utilized to prepare the isocyanate derivatives for each of the toluene alkylates, the basic method involved will be described for nonyltolyl isocyanate, the method being repeated as to its basic procedure for the preparation of the other toluene alkylates.

A mixture of 181 grams of concentrated nitric acid (specific gravity 1.42) and 280 grams of 98.5% sulfuric acid was cooled to 10° C. and then added dropwise over a period of three hours with efficient stirring to 327 grams (1.50 moles) of nonyltoluene contained in a 1-liter reaction vessel placed in a cooling bath consisting of a mixture of salt and ice, which controlled the reaction temperature during this period at approximately 32–35° C. The cooling bath was then removed and the heat of reaction raised the temperature to 50° C. where it was maintained an additional two hours, accompanied by stirring.

After cooling, the organic layer was separated from the acid layer, diluted with an equal volume of pentane, washed with water and sodium bicarbonate and dried over calcium chloride. The pentane solvent was removed by distillation at atmospheric pressure and the remaining high boiling material was fractionally distilled at a pressure of 2–3 mm. Hg absolute. The fraction boiling from 143 to 148° C. at 2 mm. pressure having a refractive index of 1.5175 was separated, weighing 302 grams. Analysis of this fraction for nitrogen and comparison of the result with the theoretical nitrogen content for the pure compound resulted in the following data:

*Nitrogen analysis.*—Calculated for $C_{16}H_{25}NO_2$: N, 5.32%. Found: N, 5.25%.

B. *Nonyltoluidine.*—The procedure employed for the reduction of the nitro group of mono-nitrononyltoluene was substantially similar to the procedure employed for reduction of the nitro group of the corresponding mono-nitrohexyltoluene and mono-nitrododecyltoluene derivatives. The reduction of mono-nitrononyltoluene was effected in accordance with the following procedure: 300 grams (1.14 mols) of mono-nitrononyltoluene, dissolved in 200 cc. of absolute ethanol, was charged with 30 grams of nickel-kieselguhr hydrogenation catalyst into a 3-liter pressure autoclave containing a glass liner, sealed, and pressured to 100 atmospheres of hydrogen. The bomb was rotated at 25° C. for 7 hours during which time the pressure was substantially constant. Following the above reduction period, the batch was removed, the catalyst filtered from the liquid product and the solvent separated from the hydrogenation product by distillation at atmospheric pressure. The higher boiling bottoms material was fractionated at a pressure of about 2–3 mm. Hg absolute pressure. A fraction boiling from 123 to 128° C. at 2 mm. Hg pressure was collected from the overhead distillate. Its refractive index was 1.5220, its specific gravity was 0.9284 and the product yield was 96.5% of theoretical. The product had an observed molecular refraction of 76.7, compared with the theoretical value for nonyltoluidine of 76.8. Analysis of the product compared with the calculated nitrogen control give the following results:

*Nitrogen analysis.*—Calculated for $C_{16}H_{27}N$: N, 6.01%. Found: N, 6.01%.

III. *Preparation of alkylaryl isocyanates*

The following procedure for the preparation of nonyltolyl isocyanate from nonyltoluidine is substantially the same as that employed for the preparation of the corresponding hexyl- and dodecyltolyl isocyanates utilizing the respective hexyl- and dodecyltoluidines as starting material. The procedure consisted essentially of reacting the alkyltoluidine with phosgene (carbonyl chloride) in the presence of an inert solvent therefor, and thereafter fractionally distilling the product to separate the desired alkylaryl isocyanate product.

A. *Nonyltolyl isocyanate.*—375 cc. of anhydrous ethyl acetate was placed in a 3-liter flask and saturated with carbonyl chloride by bubbling the latter into the solvent at room temperature. A solution of 175 grams (0.750 mol) of nonyltoluidine in 1125 cc. of ethyl acetate was added dropwise to the saturated solution of phosgene in ethyl acetate over a period of five hours while an additional quantity of carbonyl chloride was bubbled into the reaction mixture which was maintained in a turbulent state by efficient stirring. The mixture was then heated by means of a steam bath and the bulk of the ethyl acetate was distilled overhead at a slightly subatmospheric pressure. The remaining product was distilled at 2 mm. Hg absolute pressure and fractions of the product were collected. A fraction boiling from 122 to 126° C. at 2 mm. pressure, amounting to 178.3 grams or a theoretical yield of 92%, was separated as the nonyltolyl isocyanate product. The observed molecular refraction for the product was 80.6, compared with a theoretical value of 82.2; its index of refraction was 1.5412, its specific gravity was 0.9675 and its nitrogen analysis is indicated in the following table:

*Analysis.*—Calculated for $C_{17}H_{25}NO$: N, 5.40%. Found: N, 5.25%.

IV. *Preparation of alkylaryl urethane derivatives of polyoxy organic compounds*

A. *Urethane derivatives formed by the condensation of hexyltolyl isocyanate with polyalkylene glycols.*—A series of urethane type compounds was prepared by the condensation of hexyltolyl isocyanates with a number of ethylene glycol polymers having molecular weights of from about 200 to about 6000, represented by the formula:

$$H(OCH_2CH_2)_nOH$$

wherein $n$, representing the number of oxyethylene units per molecule of glycol, has a value of from about 4 to about 136. A solution of 12.0 grams (0.03 mol) of polyethylene glycol having an average molecular weight of approximately 460 and 60 cc. of pyridine was placed in a reaction vessel containing a motor driven stirrer and a distillation column. The mixture was then subjected to distillation until 15 cc. of pyridine had distilled over to completely dry the mixture. A reflux condenser was then substituted for the distillation column and 6.51 grams (0.03 mol) of hexyltolyl isocyanate, prepared as indicated above, and 15 cc. of toluene were then added dropwise to the boiling solution of polyethylene glycol under efficient stirring conditions. The hexyltolyl isocyanate solution in toluene was added to the refluxing solution of polyethylene glycol over a period of 1.5 hours, and after an additional two hours of refluxing, the reaction mixture was distilled under vacuum to remove the solvent. The absolute pressure was then reduced to 2 mm. Hg, the distillation flask heated on a water bath for one hour at the above reduced pressure to completely remove the last traces of pyridine, and the residue in the distillation flask removed as the urethane product, consisting of 18.6 grams. The resulting urethane product, free of pyridine, was a light yellow viscous syrup, soluble in water.

Urethane derivatives of hexyltolyl isocyanate utilizing polyethylene glycols having average molecular weights of from about 200 to about 6000 were also prepared by procedures similar to the method hereinabove described employing polyethylene glycol polymers of molecular weight of about 460. The reactions produced substantially quantitative yields of the urethane products which were readily soluble in water.

The product in each instance was tested for its efficiency in accordance with standard Launder-O-Meter testing procedures (1), and the rating of the detersive efficiency of the product compared with that of a commercial sodium alkylaryl sulfonate detergent composition in various aqueous concentrations designated in the following Table I:

TABLE I.—DETERGENCIES OF BUILT URETHANE DETERGENT COMPOSITIONS COMPARED WITH ALKYLARYLSULFONATE IN STANDARD WASHING TESTS [1]

| Organic Detergent Concentration in Wash Solution, wt. percent | 0.05 | 0.1 | 0.2 | 0.3 |
|---|---|---|---|---|
| $Na_2SO_4$ Builder Concentration in Wash Solution, wt. percent | 0.075 | 0.15 | 0.3 | 0.45 |

| Average Molecular Weight of Polyethylene Glycol in Urethane | Percent Detersive Efficiency [2] of Urethane Compared with Alkylarylsulfonate | | | |
|---|---|---|---|---|
| 200 | 32 | 20 | 28 | 31 |
| 400 | 38 | 43 | 58 | 51 |
| 600 | 74 | 70 | 81 | 81 |
| 1,000 | 97 | 71 | 75 | 65 |
| 1,540 | 104 | 77 | 81 | 73 |
| 4,000 | 52 | 56 | 58 | 60 |
| 6,000 | 46 | 40 | 44 | 52 |

[1] A Standard Launder-O-Meter test consists in washing for 10 minutes cotton swatches soiled with a mixture of carbon black, mineral oil and tallow in the detergent solution at 140° F., in water having 300 p. p. m. hardness, the detergent action being promoted by agitating the wash mixture with the soiled swatches in the presence of steel balls. In order to provide uniformity, the procedure was similar for all samples.

[2] Percent efficiency = $\dfrac{\text{Increase in reflectance of swatch after deterging in aqueous solution of sample}}{\text{Increase in reflectance of swatch after deterging in aqueous alkylarylsulfonate solution of same concentration}}$ The above results indicate that optimum detergent efficiency in the case of urethane derivatives prepared from hexyltolyl isocyanate is obtained in the condensation products with polyethylene glycols having molecular weights of from about 600 to about 4000, and particularly about 1000 to about 2000, and maximum efficiency of each sample is obtained at relatively low concentrations of the detergent in aqueous solution.

B. *Urethane derivatives prepared from nonyltolyl isocyanates.*—Nonyltolylurethane derivatives were prepared from polyethylene glycols having average molecular weights of from about 200 to about 6000 in accordance with the same procedure hereinabove described for the preparation of the urethane derivatives of hexyltolyl isocyanate with polyethylene glycols. The physical form of the urethane product varied from viscous liquids for urethanes prepared from glycols having average molecular weights of 200, 400 and 600 to waxy solids for urethanes of glycols having average molecular weights of 1000, 1540, 4000 and 6000. Only the product of the polyethylene glycols having an average molecular weight of 200 was relatively insoluble (to the extent of 0.1 weight percent in aqueous solution) in water, and hence, was unsuitable for use as an aqueous detergent. The product in this instance, however, was soluble in organic solvents such as hydrocarbon oils, and therefore could be utilized as a non-aqueous detergent. The following Table II presents the results of washing tests utilizing the urethane detergents prepared from nonyltolyl isocyanate and compares the detergency thereof when built to a detergent composition containing sodium sulfate as the builder salt with an alkylarylsulfonate.

TABLE II.—DETERGENCIES OF BUILT URETHAN DETERGENT COMPOSITIONS COMPARED WITH ALKYLARYLSULFONATE IN STANDARD WASHING TESTS [1]

| Organic Detergent Concentration in Wash Solution, Wt. percent | 0.05 | 0.1 | 0.2 | 0.3 |
|---|---|---|---|---|
| $Na_2SO_4$ Builder Salt Concentration in Wash Solution, Wt. percent | 0.075 | 0.15 | 0.3 | 0.45 |

| Average Molecular Weight of Polyethylene Glycol in Urethane | Percent Detersive Efficiency [2] of Urethane Compared with Alkylarylsulfonate | | | |
|---|---|---|---|---|
| 200 | | | | |
| 400 | 69 | 32 | 33 | 22 |
| 600 | 172 | 112 | 105 | 107 |
| 1,000 | 115 | 91 | 100 | 92 |
| 1,540 | 109 | 91 | 96 | 96 |
| 4,000 | 66 | 56 | 67 | 69 |
| 6,000 | 63 | 51 | 63 | 63 |

[1] See footnote (1) of Example (A), above.
[2] See footnote (2) of Example (A), above.

The above results indicate that urethane detergent products prepared from nonyltolyl isocyanate with polyethylene glycols of varying molecular weights have optimum detergent efficiency when the polyethylene glycol reactant has a molecular weight of from about 400 to about 4000 and particularly from about 500 to about 2000. The product is most efficient at low concentrations in aqueous solution, although even at higher concentrations, up to about 0.3 weight percent, the urethane product is more efficient as a detergent than the alkylarylsulfonate.

C. *Urethane type derivatives of dodecyltolyl isocyanate.*—In the preparation of these products, dodecyl isocyanate was reacted with the various polyethylene glycols varying in molecular weights from about 150 to about 6000 in accordance with the procedure hereinabove described for the condensation of hexyltolyl isocyanate with polyethylene glycols to form the resulting urethane derivatives. The products varied in physical form from syrupy liquids, in the case of the urethanes prepared from polyethylene glycols averaging in molecular weights from about 150 to about 200 inclusive, to highly viscous liquids for urethane derivatives prepared from polyethylene glycols whose molecular weights were 400 and 600, to waxy solids for urethane derivatives prepared from polyethylene glycols whose molecular weights were 1000, 1540, 4000 and 6000. All products of the dodecyl series were readily soluble in water, except for the syrupy product prepared from the polyethylene glycol polymer of average molecular weight of 150. The following Table III presents the results of washing tests utilizing a detergent composition containing the urethane derivative prepared from dodecyltolyl isocyanate built with anhydrous sodium sulfate in the concentrations designated, as compared with alkylarylsulfonate compositions containing sodium sulfate at equivalent concentration and in a similar test procedure:

TABLE III.—DETERGENCY OF BUILT URETHANE DETERGENT COMPOSITIONS COMPARED WITH ALKYLARYLSULFONATE IN STANDARD WASHING TESTS [1]

| Organic Detergent Concentration in Wash Solution, Wt. percent | 0.50 | 0.10 | 0.20 | 0.30 |
|---|---|---|---|---|
| Na$_2$SO$_4$ Builder Salt Concentration in Wash Solution, Wt. percent | 0.75 | 0.15 | 0.30 | 0.45 |

| Average Molecular Weight of Polyethylene Glycol in Urethane | Percent Detersive Efficiency,[2] Compared With Alkylarylsulfonate | | | |
|---|---|---|---|---|
| 150 | | | | |
| 200 | | | | |
| 400 | 77 | 59 | 52 | 37 |
| 600 | 172 | 137 | 93 | 84 |
| 1,000 | 131 | 110 | 108 | 107 |
| 1,540 | 115 | 108 | 96 | 104 |
| 4,000 | 77 | 72 | 63 | 70 |
| 6,000 | 54 | 50 | 49 | 52 |

[1] See footnote (1) of (A), above.
[2] See footnote (2) of (A), above.

The above results indicate that of the urethane type detergents prepared from alkyltolyl isocyanates and polyethylene glycols, the series prepared from the dodecyl alkyl derivative, as compared to the hexyl and nonyl derivatives, have maximum detergencies as a class which are optimum when the average molecular weight of the polyethylene glycol reactant is from about 400 to about 6000, and particularly from about 500 to about 2000. The results further indicate that the detergents are most effective in relatively dilute aqueous solutions, although even at higher concentrations the product is more effective than the alkylarylsulfonate at equivalent concentrations.

Further wash tests on the hexyl-, monyl-, and dodecyl-tolyl polyoxyethylene urethanes showed that the effect of sodium sulfate builder on the detergency was relatively minor as compared with its effect on the alkylarylsulfonate, and that equal detergency could be obtained with much smaller amounts of unbuilt urethanes than of built alkylarylsulfonate.

EXAMPLE II

The effect of including a nitrogenous organic base as a catalyst in the preparation of an alkylaryl isocyanate with a hydroxyl compound is indicated in the following comparative experiments. 30 grams (0.1 mol) of dodecyltolyl isocyanate was refluxed with 46 grams (1 mol) of absolute ethanol for 30 minutes and the extent of the resulting condensation between these reactants was noted by the percentage of recovery of ethanol from the reaction mixture. Upon distillation of the reaction mixture after 30 minutes of reflux, 43.5 grams of ethanol were recovered, indicating that roughly about 50% of the isocyanate underwent condensation with the ethanol. The alcohol was returned to the reaction mixture and refluxing was continued for an additional 3.5 hours after which 41 grams of ethanol were recovered by distillation. The resulting urethane was a viscous syrup which was insoluble in water and an analysis of the products for nitrogen yielded the data indicated in the following tabulation:

Nitrogen analysis.—Calculated for

C$_{19}$H$_{31}$NHCOOC$_2$H$_5$:N, 4.03%

Found: N, 4.35%.

In contrast with the above non-catalyzed reaction mixture, a second mixture of 30 grams of dodecyltolyl isocyanate (0.1 mol), 46 grams (1 mol) of absolute ethanol, and 5 grams of pyridine was prepared at room temperature which heated spontaneously and after standing for 30 minutes, the mixture was subjected to distillation. The original 5 grams of pyridine were recovered and 41 grams of ethanol distilled over, leaving a residue consisting of a viscous syrup, insoluble in water, which upon analysis for nitrogen yielded approximately the same results as indicated in the prior reaction.

EXAMPLE III

Urethane derivatives prepared by the condensation of alkylaryl isocyanates with carbohydrates A. *Condensation of dodecyltolyl isocyanate with sucrose.*—6 grams (0.018 mol) of powdered sucrose, previously dried at 110° C. for one hour, and 5 grams (0.016 mol) of dodecyltolyl isocyanate were placed in a reaction vessel and stirred at 105° C. for 36 hours. The product recovered from the reaction mixture weighed 5.8 grams and was identified as sucrose; no reaction had taken place after 36 hours of heating at the above temperature conditions.

The catalytic effect of nitrogenous organic bases was again indicated in the following run, in which the above attempted condensation was effected in the presence of pyridine as a catalyst and solvent. 17.1 grams (0.05 mol) of dried and powdered sucrose was placed in a reaction flask equipped with a reflux column. 200 cc. of pyridine was introduced and the sucrose dissolved therein by refluxing at the boiling point of the pyridine. 90 cc. of pyridine was then distilled over to insure a completely anhydrous system, the sucrose remaining dissolved in the residual pyridine. 15.1 grams (0.05 mol) of dodecyltolyl isocyanate was then added dropwise to the boiling sucrose solution in pyridine over a period of one hour. Heating was continued an additional three hours, followed by removal of the pyridine therefrom by distillation at atmospheric pressure until the liquid temperature was 120° C. The remaining pyridine was completely removed by heating the remaining mixture under vacuum upon a steam bath. To remove any possible unreacted sugar, 20 grams of the produce was dissolved in 25 cc. diethyl ether and extracted 5 times with 5 cc. portions of water. The water extract phase was evaporated to dryness and was identified as unreacted sucrose. The ether solution was dried over anhydrous calcium sulfate and the solvent removed by distillation. A light yellow, solid powder remained, weighing 18 grams. Analysis of the powder for nitrogen indicated the following results:

*Nitrogen analysis.*—
Calculated for C$_{12}$H$_{12}$O$_{11}$·C$_{19}$H$_{31}$NCO : N, 2.17%.
Found N, 2.87%.

The high nitrogen analysis found for the product is probably explained on the basis that it consists partly of a compound resulting from the condensation of 1 mol of the isocyanate with 1 hydroxyl group of a sucrose molecule in admixture with a considerable amount of material resulting from the reaction of two or more molecules of the isocyanate with one molecule of sucrose.

B. *Condensation of dodecyltolyl isocyanate with glucose.*—Dry, powdered glucose was mixed with pyridine and the mixture heated at the refluxing temperature of the pyridine while dodecyltolyl isocyanate was introduced dropwise into the mixture accompanied by vigorous stirring, in the manner described for Part A (above). The resulting white solid product was insoluble in water.

We claim as our invention:

1. An alkylaryl hydrocarbon N-substituted urethan having the empirical formula: R(R')$_n$—Ar—NHCOOZ, wherein Ar is a polyvalent aryl hydrocarbon nucleus selected from the group consisting of the mono- and bicyclic aryl hydrocarbons, n is a numeral selected from the group consisting of 0, 1, and 2, R is an alkyl group containing from 3 to about 15 carbon atoms, R' is an alkyl group containing from 1 to 2 carbon atoms, and Z is a monovalent radical of a member selected from the group consisting of polyoxy alkylene glycol, a polyoxyalkylene glycol ether, a polyoxy alkylene glycol ester, a polyhydroxy-substituted paraffinic hydrocarbon, a polyhydroxy-substituted cycloparaffinic hydrocarbon, and a carbohydrate.

2. An alkylaryl hydrocarbon N-substituted urethan having the empirical formula:

R(R')$_n$—Ar—NHCOO(ZO)$_m$H wherein Ar is a polyvalent aryl hydrocarbon nucleus selected from the group consisting of the mono- and bicyclic aryl hydrocarbons, n is a numeral selected from the group consisting of 0, 1, and 2, R is an alkyl group containing from about 3 to about 15 carbon atoms, R' is an alkyl group containing from 1 to 2 carbon atoms, Z is a bivalent alkylene group containing from 2 to 5 carbon atoms, and m is a whole number having a value of from about 5 to about 150.

3. The process of claim 15 further characterized in that said alkylaryl isocyanate is reacted with said polyoxy organic compound in the presence of an organic nitrogen base containing a tertiary substituted nitrogen atom in an amount of from about 0.1 to about 20 weights per weight of said alkylaryl isocyanate.

4. The process of claim 3 further characterized in that said organic nitrogen base is pyridine.

5. The process of claim 3 further characterized in that said alkylaryl isocyanate is reacted with said polyoxy organic compound at a temperature of from about 30° to about 150° C.

6. The process of claim 16 further characterized in that said alkylbenzene isocyanate is nonyltolylisocyanate.

7. The process of claim 16 further characterized in that said alkylbenzene isocyanate is dodecyltolyl isocyanate.

8. A compound as defined in claim 1 further characterized in that Ar is phenyl.

9. A compound as defined in claim 2 further characterized in that Ar is phenyl.

10. The process of claim 15 further characterized in that said polyoxy compound is a polyethylene glycol containing an average of from about 5 to about 150 oxyethylene groups per molecule.

11. The process of claim 15 further characterized in that said polyoxy compound is a polyethylene glycol containing an average of from about 10 to about 50 oxyethylene groups per molecule.

12. The process of claim 16 further characterized in that said polyoxy compound is a polyethylene glycol containing an average of from about 5 to about 150 oxyethylene groups per molecule.

13. The process of claim 16 further characterized in that said polyoxy compound is a polyethylene glycol containing an average of from about 10 to about 50 oxyethylene groups per molecule.

14. An N-(alkylaryl) carbamic acid ester of a polyoxy organic compound, said ester being further characterized in that the alkylaryl radical is substituted on the nitrogen atom of the carbamyl group of said ester and is selected from the mono- and bicyclic aryl hydrocarbon radicals containing a single alkyl substituent on the aryl nucleus having from 3 to about 15 carbon atoms.

15. A process for the production of an alkylaryl mono-urethan which comprises reacting compound (1) with compound (2), said compound (1) consisting of: a mono-(alkylaryl)-substituted isocyanate in which said alkylaryl radical is substituted on the isocyanate nitrogen atom of said isocyanate and is selected from the mono- and bicyclic aryl hydrocarbon radicals containing a single alkyl substituent on the aryl nucleus having from 3 to about 15 carbon atoms, and said compound (2) is a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

16. A process for the production of an alkylaryl mono-urethan which comprises reacting compound (1) with compound (2), said compound (1) consisting of an alkylbenzene isocyanate in which the alkylbenzene radical is substituted on the isocyanate nitrogen atom of said isocyanate and contains a single nuclear alkyl substituent having from 3 to about 15 carbon atoms, and compound (2) is a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

17. An N-(hexyltolyl) carbamic acid ester of a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon and a carbohydrate.

18. An N-(nonyltolyl) carbamic acid ester of a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon, and a carbohydrate.

19. An N-(dodecyltolyl) carbamic acid ester of a polyoxy organic compound selected from the group consisting of a poly-(oxyalkylene) glycol, a poly-(oxyalkylene) glycol ether, a poly-(oxyalkylene) glycol ester, a polyhydroxy-substituted paraffinic hydrocarbon, a polyhydroxy-substituted cycloparaffinic hydrocarbon and a carbohydrate.

References Cited in the file of this patent

UNITED STATES PATENTS

| Number | Name | Date |
| --- | --- | --- |
| 2,041,733 | Werntz | May 26, 1936 |
| 2,197,479 | Meigs | Apr. 16, 1940 |

OTHER REFERENCES

Hearon, "Journal of American Chemical Society," pages 297–8 70 (1948).

Goldschmidt et al., Zeitschrift für Physikalische Chemie," 14 pages 394–408.